(12) United States Patent
Sim et al.

(10) Patent No.: US 12,358,485 B2
(45) Date of Patent: Jul. 15, 2025

(54) ELECTRO-MECHANICAL BRAKE SYSTEM AND METHOD FOR OPERATING SAME

(71) Applicant: HL MANDO CORPORATION, Pyeongtaek-si (KR)

(72) Inventors: Gyunghun Sim, Seongnam-si (KR); Jaehoon Jang, Seoul (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 552 days.

(21) Appl. No.: 17/794,361

(22) PCT Filed: Feb. 4, 2021

(86) PCT No.: PCT/KR2021/001441
§ 371 (c)(1),
(2) Date: Jul. 21, 2022

(87) PCT Pub. No.: WO2021/158022
PCT Pub. Date: Aug. 12, 2021

(65) Prior Publication Data
US 2023/0057483 A1  Feb. 23, 2023

(30) Foreign Application Priority Data

Feb. 6, 2020  (KR) .................. 10-2020-0014449

(51) Int. Cl.
*B60T 13/74* (2006.01)
*B60T 1/06* (2006.01)
(Continued)

(52) U.S. Cl.
CPC .......... *B60T 13/746* (2013.01); *B60T 1/065* (2013.01); *F16D 55/226* (2013.01); *F16D 65/18* (2013.01);
(Continued)

(58) Field of Classification Search
None
See application file for complete search history.

(56) References Cited

U.S. PATENT DOCUMENTS 8,448,757 B2 * 5/2013 Vollert .................. F16D 65/567
188/196 D
2004/0026183 A1 * 2/2004 Trinh ...................... F16D 65/18
188/72.7
(Continued)

FOREIGN PATENT DOCUMENTS

DE         4312524 A1 * 10/1994 ............ B60T 13/741
EP          125873 A  * 11/1984 ............ B60T 13/743
(Continued)

OTHER PUBLICATIONS

WO-2019068794-A1—English Machine Translation (Year: 2019).*
(Continued)

*Primary Examiner* — Melanie Torres Williams
(74) *Attorney, Agent, or Firm* — Hauptman Ham, LLP (57) ABSTRACT

Provided is an electro-mechanical brake system and a method of operating the same including: a pair of pad plates disposed on both sides of a disk rotating together with a wheel; a piston configured to allow the pad plates to come in close contact with or to be separated from the disk; a first motor and a second motor configured to operate independently from each other and provide the piston with power; a first gear configured to decelerate power of the first motor and transmit the decelerated power; a second gear configured to convert power of the second motor into a translational motion and apply pressure to or release pressure on the piston while in contact with the piston, the second gear including a guide part slantly formed on a portion that comes in contact with the piston; and a connecting part connecting the first gear and the second gear to each other to allow the first gear and the second gear to rotate together with each (Continued)

other, the connecting part configured to couple the first gear and the second gear such that the second gear is slidable with respect to the first gear.

15 Claims, 7 Drawing Sheets

(51) Int. Cl.
  *F16D 55/226* (2006.01)
  *F16D 65/18* (2006.01)
  *B60T 17/22* (2006.01)
  *F16D 121/24* (2012.01)
  *F16D 125/36* (2012.01)
  *F16D 125/40* (2012.01)
  *F16D 125/44* (2012.01)

(52) U.S. Cl.
  CPC ........... *B60T 17/22* (2013.01); *B60T 2270/10* (2013.01); *B60T 2270/402* (2013.01); *B60T 2270/406* (2013.01); *F16D 2121/24* (2013.01); *F16D 2125/36* (2013.01); *F16D 2125/40* (2013.01); *F16D 2125/44* (2013.01)

(56) References Cited

U.S. PATENT DOCUMENTS

| | | |
|---|---|---|
| 2004/0178027 A1 | 9/2004 | Hartsock |
| 2015/0354650 A1 | 12/2015 | Bull |
| 2018/0328430 A1* | 11/2018 | Feigel ................... B60T 13/746 |

FOREIGN PATENT DOCUMENTS

| | | | |
|---|---|---|---|
| EP | 0125873 A2 * | 11/1984 | |
| JP | H08-253115 A | 10/1996 | |
| JP | 2004-044778 A | 2/2004 | |
| KR | 10-2018-0125240 A | 11/2018 | |
| WO | WO-2019068794 A1 * | 4/2019 | ............ B60T 13/741 |

OTHER PUBLICATIONS

DE-4312524-A1—English Machine Translation (Year: 1994).*
International Search Report (with partial translation) and Written Opinion issued in corresponding International Patent Application No. PCT/KR2021/001441, dated Jun. 3, 2021.

* cited by examiner

ELECTRO-MECHANICAL BRAKE SYSTEM AND METHOD FOR OPERATING SAME

CROSS-REFERENCE TO RELATED APPLICATION

This application is the U.S. National Phase under 35 U.S.C. § 371 of International Patent Application No. PCT/KR2021/001441, filed on Feb. 4, 2021, which in turn claims the benefit of Korean Application No. 10-2020-0014449, filed on Feb. 6, 2020, the entire disclosures of which applications are incorporated by reference herein.

BACKGROUND

1. Field

The present disclosure relates to an electro-mechanical brake system and a method of operating the same, and more specifically, to an electro-mechanical brake system for realizing braking and parking of a vehicle using power of a motor and a method of operating the same.

2. Description of the Related Art

An electro-mechanical brake system of a concept of next-generation brake is an apparatus for detecting a drivers intention to brake and then adjusting the braking pressure of front and rear wheels using an electric motor, such as a motor.

The electro-mechanical brake system enables all types of intelligent functions not only including general braking functions, an anti-lock brake system (ABS) function, an electronic stability control (ESC) function, a vehicle dynamic control (VDC) function, but also including automatic braking functions required for intelligent constant speed driving devices in the future.

Such an electro-mechanical brake system uses a motor and a decelerator to generate an appropriate braking pressure in a caliper, and performs service brake and parking brake functions through the braking pressure.

SUMMARY

Therefore, it is an object of the disclosure to provide an electro-mechanical brake system capable of effectively implementing braking in various operating situations and a method of operating the same.

It is an object of the disclosure to provide an electro-mechanical brake system capable of achieving rapid braking, and a method of operating the same.

It is an object of the disclosure to provide an electro-mechanical brake system having an improved performance and operational reliability, and a method of operating the same.

It is an object of the disclosure to provide an electro-mechanical brake system having an improved durability of a product by reducing a load applied to a component element, and a method of operating the same.

The technical objectives of the disclosure are not limited to the above, and other objectives may become apparent to those of ordinary skill in the art based on the following descriptions.

According to an aspect of the disclosure, there is provided an electro-mechanical brake system including: a pair of pad plates disposed on both sides of a disk rotating together with a wheel; a piston configured to allow the pad plates to come in close contact with or to be separated from the disk; a first motor and a second motor configured to operate independently from each other and provide the piston with power; a first gear configured to decelerate power of the first motor and transmit the decelerated power; a second gear configured to convert power of the second motor into a translational motion and apply pressure to or release pressure on the piston while in contact with the piston, the second gear including a guide part slantly formed on a portion of the second gear that comes in contact with the piston; and a connecting part connecting the first gear and the second gear to each other to allow the first gear and the second gear to rotate together with each other, the connecting part configured to couple the first gear and the second gear such that the second gear is slidable with respect to the first gear.

The connecting part may include a plurality of connection holes passing through an upper side and a lower side of the first gear and a plurality of connection pins provided to be slidably coupled to the plurality of connection holes.

The guide part may include a first surface protruding forward with a slope such that a force to press the piston is gradually increased during a rotation of the second gear and a second surface obliquely depressed rearward such that the force, passing through the first surface, to press the piston is released.

The electro-mechanical brake system may further include a belt part configured to transmit power output through a drive shaft of the first motor to the first gear.

The second gear may be provided with a nut part that allows the second gear to move forward and backward according to a rotation of a spindle for outputting power of the second motor.

A plurality of the guide parts may be consecutively provided along a circumferential direction on a front surface of the second gear.

The guide part may be provided to come in contact with a rear portion of the piston.

The piston may include a rotating ball supported at the rear end thereof to enable free rotation.

The nut part may be formed in a hollow cylinder shape and connected to the second motor by passing through the first gear.

The electro-mechanical brake system may further include a control part configured to detect whether the first motor and the second motor operate, and control the operation of the first motor and the second motor.

According to another aspect of the disclosure, there is provided a method of operating an electro-mechanical brake system, wherein the guide part is provided as a plurality of guide parts consecutively provided along a circumferential direction of the second gear, and by the first gear and the second gear rotating together with each other according to operation of the first motor, repeatedly applies pressure to and releases pressure on the piston.

The second gear may be configured to, when the second motor rotates in one direction, slidably advance to press the piston, and when the second motor rotates in an opposite direction, slidably retreat to release the pressure of the piston.

In a first mode to implement an anti-lock brake system (ABS), the control part may be configured to control to drive the first motor while the second motor is prevented from being driven.

In a second mode to stop a vehicle, the controller may be configured to control to rotate the second motor in the one direction.

In a third mode to implement an emergency braking, the control part may be configured to control the first motor to drive in a direction that the piston is pressed by the guide part and control the second motor to rotate in the one direction.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, embodiments of the present disclosure will be described in detail with reference to the accompanying drawings. The following embodiments are presented in order to sufficiently convey the spirit of the present disclosure to those of ordinary skill in the art to which the present disclosure pertains. The present disclosure is not limited to the embodiments presented herein, and may be embodied in other forms. The drawings may omit illustration of parts irrelevant to the description in order to clarify the present disclosure, and may slightly exaggerate the size of the components to help understanding.

Referring to FIGS. 1 to 5, an electro-mechanical brake system according to the present disclosure includes: a pair of pad plates 21 and 22 disposed on both sides of a disk D rotating together with a wheel; a piston 10 configured to allow the pad plates 21 and 22 to come in close contact with or to be separated from the disk D; a first motor M1 and a second motor M2 configured to operate independently from each other and provide the piston 100 with power; a first gear 210 configured to decelerate power of the first motor M1 and transmit the decelerated power; a second gear 220 configured to convert power of the second motor M2 into a translational motion and apply pressure to or release pressure on the piston 100 while in contact with the piston 100, the second gear 220 including a plurality of guide parts slantly formed on a portion of the second gear that comes in contact with the piston 100; and a connecting part 230 connecting the first gear 210 and the second gear 220 to each other to allow the first gear 210 and the second gear 220 to rotate together with each other, the connecting part 230 configured to engage the first gear 210 and the second gear 220 such that the second gear 220 is slidable with respect to the first gear.

The electro-mechanical brake system according to the present embodiment may be applied to, for example, a floating type caliper brake, but the present disclosure is not limited thereto.

Figure 1:
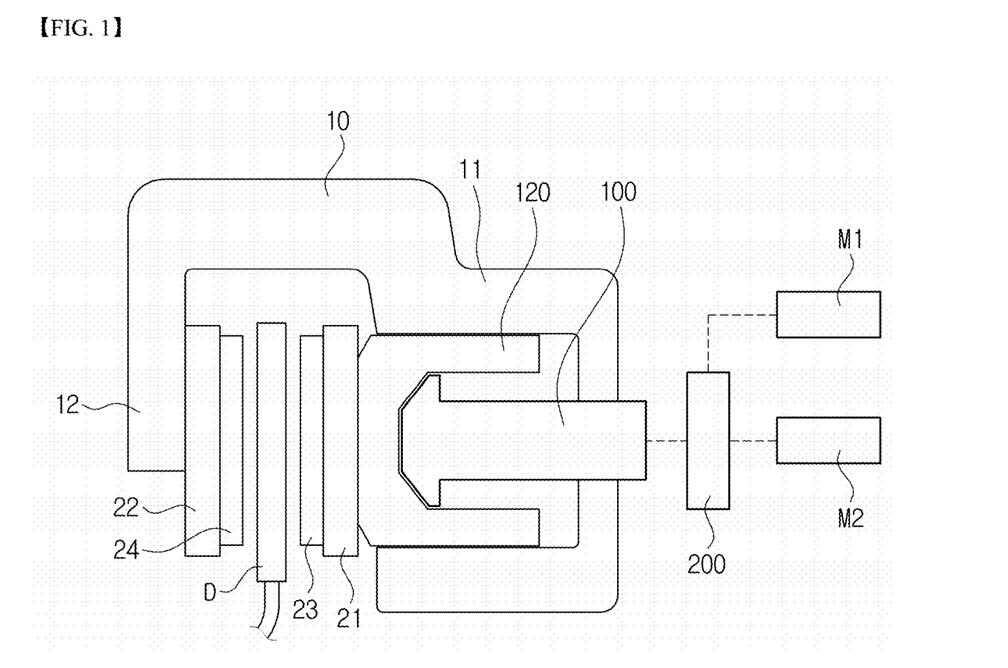
FIG. 1 is a view illustrating a caliper brake to which an electro-mechanical brake system according to an embodiment of the present disclosure is applied.

Referring to FIG. 1, the pair of pad plates 21 and 22 may be slidably installed on a carrier (not shown) of a caliper housing 10, and friction pads 23 and 24 may each be attached to an inner surface of a respective one of the pair of pad plates 21 and 22. The pair of pad plates 21 and 22 may include an inner pad plate 21 of which an outer surface is pressed or released by the piston 100 and an outer pad plate 22 of which an outer surface is disposed to come in contact with a finger part 12 of the caliper housing 10, and therefore may be slidably installed on the carrier.

The caliper housing 10 includes a finger part 12 for operating the outer pad plate 22 and a cylinder 11 in which the piston 100 is installed, and the caliper housing 10 is slidably coupled to the carrier. Accordingly, during a braking operation, the caliper housing 10 is slidably moved rightward in FIG. 1 from the carrier by a repulsive force according to movement of the piston 100 to cause the outer pad plate 22 to be pushed toward the disk D and pressed against the disk D by the finger 12.

The piston 100 may apply pressure to or release pressure on the outer surface of the inner pad plate 21. The piston 100 may allow the inner pad plate 21 to be pressed against or separated from the disk D using a power transmission part 200 to be described below. That is, the piston 100 may apply pressure to the inner pad plate 21 so that the inner pad plate 21 comes in close contact with the disk D, or may release the pressure on the inner pad plate 21 so that the inner pad plate 21 is spaced apart from the disk D. That is, the piston 100 advances and retreats within the cylinder 11 of the caliper housing 10 to apply pressure to or release pressure on the inner pad plate 21. On the other hand, the unexplained reference numeral "101" denotes a rotating ball 101 inserted into a rear end of the piston 100 and supported to enable free rotation, and the rotating ball 101 may allow a first surface 221a and a second surface 221b of a guide part 221, which will be described below, to smoothly pass through the piston 100.

On the other hand, the unexplained reference numeral "120" denotes a cup part 120 accommodated in the cylinder 11 of the caliper housing 10, and the cup part 120 may have one side open to accommodate the piston 100, and may be slidably inserted into the cylinder of the caliper housing 10. The cup part 120 may apply a pressure to or release a pressure on the inner pad plate 21 by the axial force of the piston 100.

The piston 100 may have a front end facing the inner pad plate 21 and a rear end drivingly connected to the power transmission part 200, to be described below. The power of the first motor M1 or the second motor M2 may be transmitted to the piston 100 through the power transmission part 200, and the axial force of the piston 100 may apply pressure to or release pressure on the inner pad plate 21.

The first motor M1 and the second motor M2 may be operated independently from each other. The first motor M1 and the second motor M2 are provided to receive power from a power supply device (not shown), such as a battery of the vehicle, to generate and provide power required for braking and release of braking of the vehicle. The first and second motors M1 and M2 may each include a drive shaft that transmits power to the outside. In addition, the first motor M1 may be provided as a direct current (DC) motor or an alternating current (AC) motor, and the same applies to the second motor M2. Meanwhile, the operations of the first motor M1 and the second motor M2 may be controlled independently from each other, and power according to the rotation of the first motor M1 and the second motor M2 may be provided through the power transmission part 200 as a power for forward and backward movement of the piston 100.

The power transmission part 200 is provided to transmit power of the first motor M1 and the second motor M2 to the piston 100. In more detail, the power transmission part 200 may include a first gear 210, a second gear 220, and a connecting part 230.

Referring to FIGS. 2 to 5, the first gear 210 may be drivingly connected to the drive shaft of the first motor M1. The first gear 210 may decelerate power generated according to the rotation of the first motor M1 and transmit the power to the second gear 220. The first gear 210 may be connected to the drive shaft of the first motor M1 through a belt part 240. The belt part 240 transmits the power output through the drive shaft of the first motor M1 to the first gear 210. A thread 210a may be formed on the outer peripheral surface of the first gear 210, and a thread corresponding to the thread 210a of the first gear 210 may be formed on the inner peripheral surface of the belt part 240 to be meshed with the thread 210a. Meanwhile, the first gear 210 may be provided in the shape of a spur gear, but the disclosure is not limited thereto.

Figure 2:
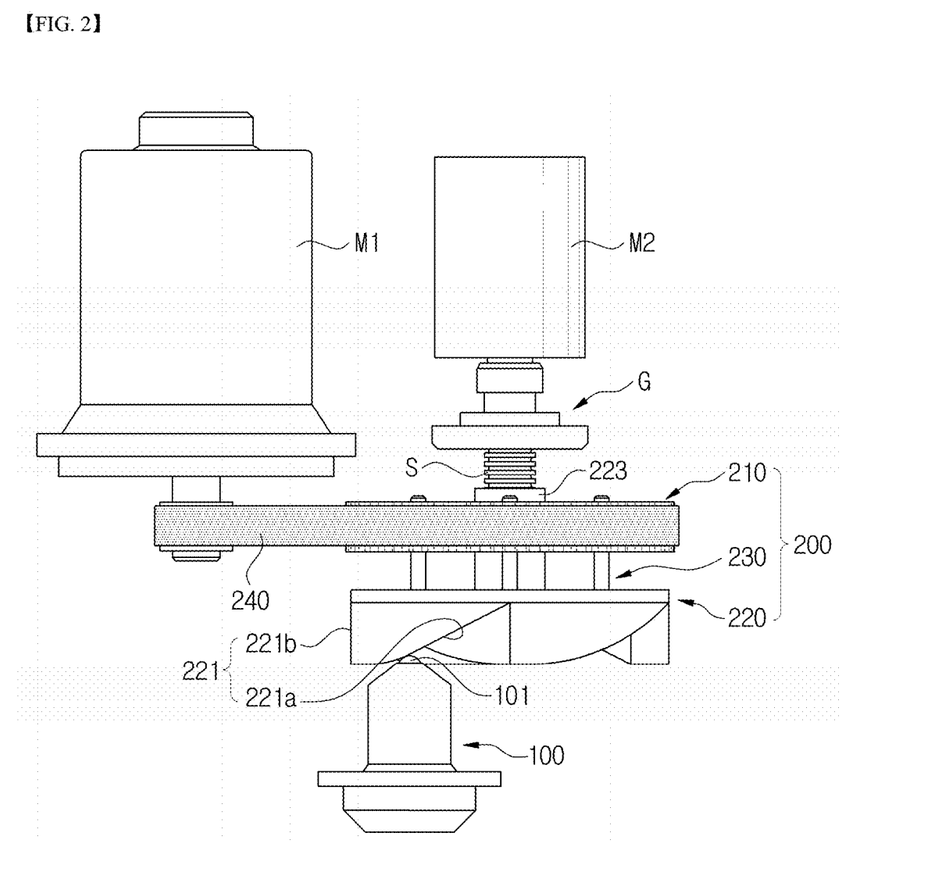
FIG. 2 is a view illustrating an electro-mechanical brake system according to an embodiment of the present disclosure.

The second gear 220 may convert the power of the second motor M2 into a translational motion. That is, when the second motor M2 rotates in one direction, the second gear 220 may slide in a direction of pressing the piston 100, and when the second motor M2 rotates in the opposite direction, the second gear 220 may slide in a direction of releasing the pressure on the piston 100. Referring to FIG. 2, when the second motor M2 rotates in one direction, the second gear 220 slides downward to press the piston 100, and when the second motor M2 rotates in the opposite direction, the second gear 220 slides upward to release the pressure on the piston 100.

The second gear 220 may include a body part 222, a nut part 223 having a hollow cylindrical shape and protruding upward from an upper surface of the body part 222, and a guide part 221 protruding downward from a lower surface of the body part 222 and having a slanting shape.

As shown in the drawings, the body part 222 of the second gear 220 may be provided in a disk shape having a predetermined thickness, but is not limited thereto and may be provided in various shapes. The nut part 223 may be provided on the upper surface of the body part 222 of the second gear 220. The nut part 223 of the second gear 220 may be provided in a hollow cylindrical shape as shown in the drawing. The nut part 223 of the second gear 220 may be inserted into a passing part 212 passing through an upper side and a lower side of the first gear 210. On the other hand, the nut part 223 of the second gear 220 may be connected to a spindle S for outputting power of the second motor M2 as will be described below, and move forward and backward according to the rotation of the spindle S.

Figure 4:
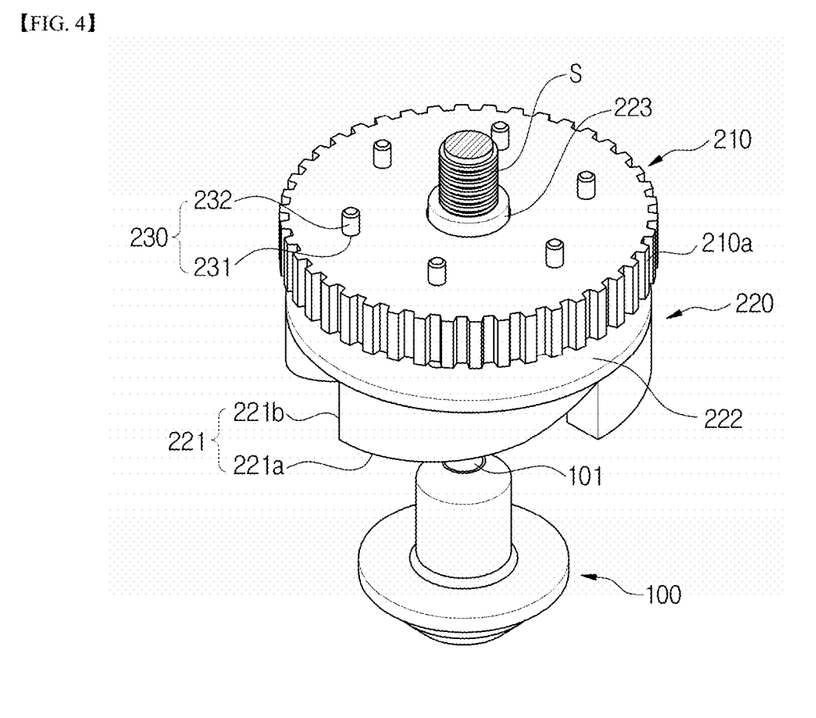
FIG. 4 is a combined perspective view illustrating an electro-mechanical brake system according to an embodiment of the present disclosure.
Figure 5:
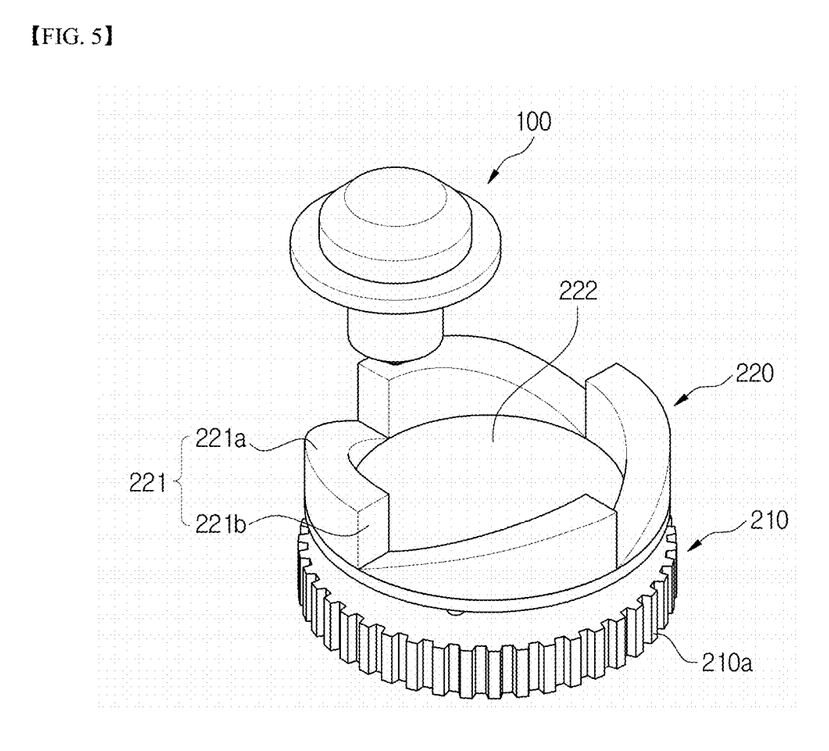
FIG. 5 is a perspective view illustrating a guide part viewed from below according to an embodiment of the present disclosure.

Referring to FIGS. 4 to 5, the guide part 221 of the second gear 220 may be formed on a front surface of the second gear 220 so as to come in contact with the rear end of the piston 100. The guide part 221 of the second gear 220 may apply pressure to or release the pressure on the rear end of the piston 100 according to the operation of the second gear 220. The guide part 221 may be formed with a slope as shown in the drawing. On the other hand, the guide part 221 is provided in plural along the circumferential direction, and when the first motor M1 is driven, the first gear 210 and the second gear 220 are rotated together with each other to repeatedly transmit a force to press the piston 100 or a force to release the pressure on the piston 100. The piston 100 may, when pressed by the second gear 220, advance within the cylinder 11 of the caliper housing 10 to press the inner pad plate 21, and when released by the second gear 220, retreat within the cylinder 11 of the caliper housing 10 to release the pressure on the inner pad plate 21.

Meanwhile, the guide part 221 may have the first surface 221a and the second surface 221b. The first surface 221a of the guide part 221 may be protruded forward with a slope such that a force to press the piston 100 is gradually increased during a rotation of the second gear 220, and the second surface 221 may be depressed rearward with a slope such that the force, passing through the first surface 221a, to press the piston 100 is released. The plurality of guide parts 221 may be arranged in a circle on the lower surface of the body part 222 of the second gear 220. Meanwhile, the second surface 221b may be formed to be perpendicular to the body part 222 as shown, but is not limited thereto, and may be formed to have a predetermined inclination angle with respect to the body part 222. Meanwhile, four guide parts 221 may be provided as shown in the drawing, but the number of guide parts 221 is not limited thereto and may be provided in various numbers according to design.

Referring to FIG. 5, when the second gear 220 is rotated clockwise, in a section in which the rear end of the piston 100 is passed by the first surface 221a of the guide part 221, the force to press the piston 100 is gradually increased, and in a section in which the rear end of the piston 100 is passed by the second surface 221b of the guide part 221, the force to press the piston 100 is released. That is, in the section in which the rear end of the piston 100 is passed by the first surface 221a of the guide part 221, the second gear 220 slides in a direction the piston 100 presses the inner pad plate 21, and in the section in which the rear end of the piston 100 is passed by the second surface 221b of the guide part 221, the second gear 220 slides in a direction the piston 100 releases the pressure on the inner pad plate 21.

The connecting part 230 may connect the first gear 210 and the second gear 220 to each other such that the first gear 210 and the second gear 220 rotate together with each other to cause the second gear 220 to be slidably coupled to the first gear 210. More specifically, the connecting part 230 may include a plurality of connection holes 231 passing through an upper side of the first gear 210 and a lower side of the first gear 210 and a plurality of connection pins 232 protruding from the body part 222 and slidably coupled to the plurality of connection holes 231.

The connecting part 230 may be configured to, by a rotation of the first gear 210 as the first motor M1 rotates, guide the second gear 220 to rotate together with the first gear 210. That is, since the connection pin 232 of the second gear 220 is inserted into the connection hole 231 of the first gear 210, the rotational force of the first gear 210 is transferred through the connection hole 231 and the connection pin 232 to the second gear 220 to cause the second gear 220 to be rotated together with the first gear 220.

In addition, the connecting part 230 may be configured, by the second motor M2 rotating in one direction or the opposite direction, to guide the second gear 220 to slide forward or backward with respect to the first gear 210. When the spindle S outputting the power of the second motor M2 rotates in one direction or the opposite direction, the nut part 223 of the second gear 220 coupled to the spindle S is provided to slide forward or backward without rotating together with the spindle S. That is, with the connecting pin 232 being inserted into the connecting hole 231 of the first gear 210, the second gear 220 is prevented from being rotated together with the spindle S. Accordingly, the rotational force of the spindle S for outputting the power of the second motor M2 is converted into a translational motion, and the second gear 220 may slidably advance and retreat with respect to the first gear 210. With reference to FIG. 2, the second gear 220 may slide downward to press the piston 100 or slide upward to release the pressure on the piston 100.

The second gear 220 may have the nut part 223 reciprocatingly coupled to the spindle S. As shown in the drawing, the spindle S may be provided to be indirectly connected to the second motor M2 through a reduction gear part G. Alternatively, the spindle S may be provided as a drive shaft of the second motor M2, that is, in a direct connection method. Meanwhile, the reduction gear part G may be provided in various types of gears, and may decelerate the power of the second motor M2 and transmit the power to the spindle S.

On the other hand, the second gear 220 may, when the second motor M2 rotates in one direction, slide forward to press the piston 100, and when the second motor M2 rotates in the opposite direction, slide backward to release the pressure of the piston 100. On the other hand, the guide part 221 is provided in plural, and when the first motor M1 is driven, the first gear 210 and the second gear 220 may be rotated together with each other to repeatedly transmit a force to press the piston 100 or a force to release the piston 100.

That is, the second gear 220 may, upon driving of the first motor M1, rotate such that the first surface 221a and the second surface 221b of each of the plurality of guide parts 221 sequentially press the piston and then release the pressure on the piston 100. In addition, the second gear 220 may, upon rotation of the second motor M2 in one direction, slide forward in a direction to press the piston 100 and upon rotation of the second motor M2 in the opposite direction, slide backward in a direction to release the pressure of the piston 100.

The electro-mechanical brake system according to the present disclosure may further include a control part (not shown). The control part according to the embodiment of the present disclosure may be implemented through a non-volatile memory (not shown) configured to store data related to an algorithm for controlling the operation of various components or software instructions for reproducing the algorithm, and a processor (not shown) configured to use data stored in the memory to perform operations described below. Here, the memory and the processor may be implemented as separate chips. Alternatively, the memory and processor may be implemented as a single chip integrated with each other. The processor may take the form of one or more processors.

The control part may detect whether the first motor M1 and the second motor M2 operate, and control the operations of the first motor M1 and the second motor M2.

Hereinafter, the operation of the electro-mechanical brake system according to the present disclosure will be described.

A first mode is to implement an anti-lock brake system (ABS) when braking is performed during travel of a vehicle. In the first mode, the control part controls the first motor M1 to be driven and controls the second motor M2 not to be driven. When the first motor M1 is driven, the drive shaft of the first motor M1 is rotated, and the belt part 240 connected to the drive shaft of the first motor M1 transmits power of the first motor M1 to the first gear 210. The first gear 210 may be rotated in a "T1" direction of FIG. 3 by the belt part 240. In addition, the second gear 220 may receive the rotational force of the first gear 210 through the connecting part 230 to thereby be rotated in a "T2" direction of FIG. 3. Meanwhile, the rear end of the piston 100 comes in contact with the guide part 221 of the second gear 220.

Figure 3:
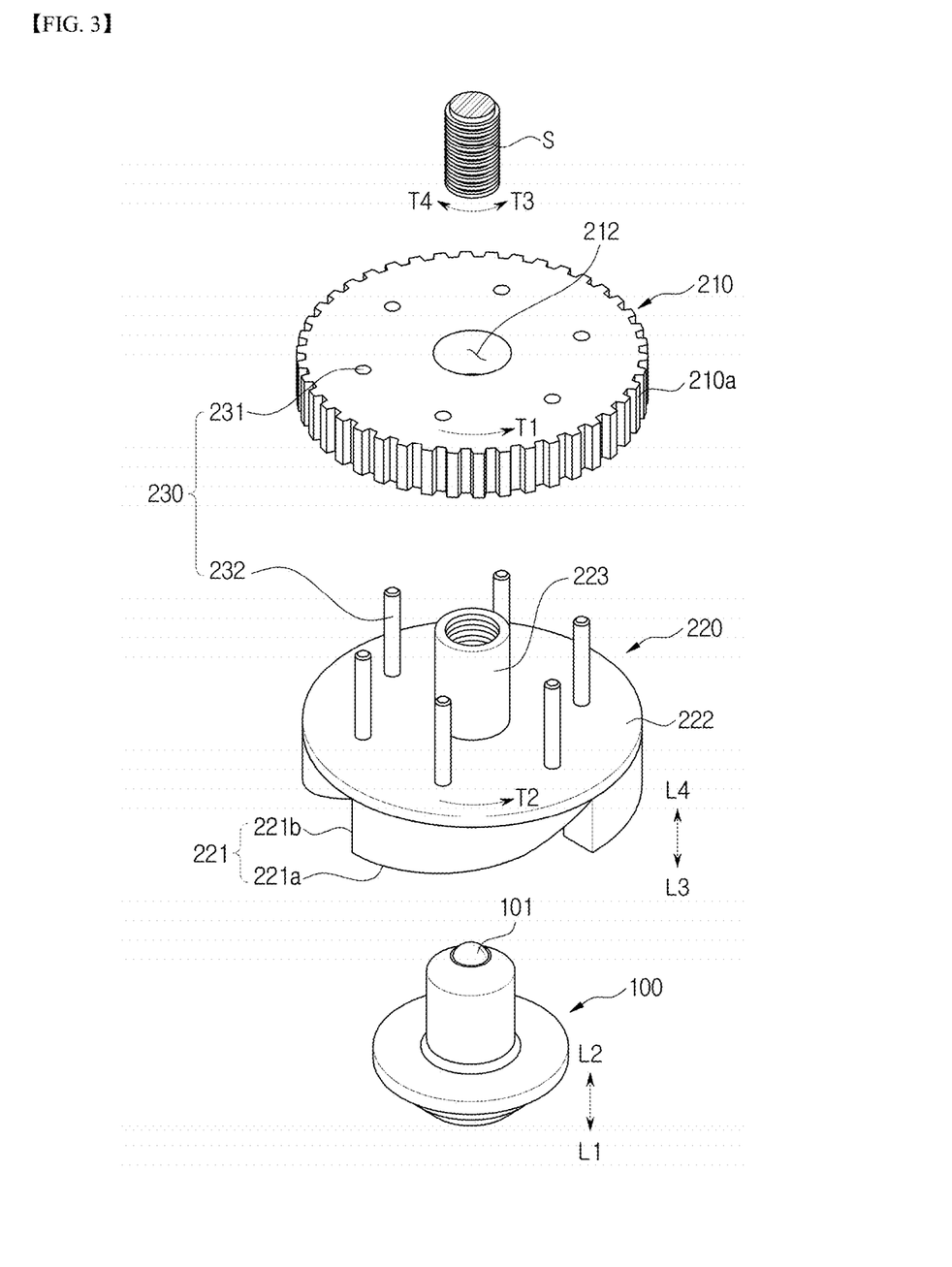
FIG. 3 is an exploded perspective view illustrating an electro-mechanical brake system according to an embodiment of the present disclosure.
Figure 6:
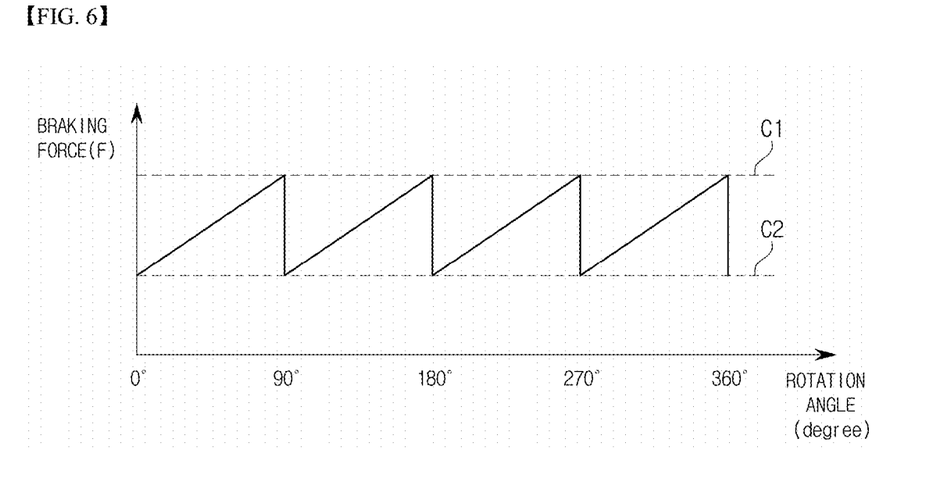
FIGS. 6 to 7 are graphs showing a brake braking force according to an operation of an electro-mechanical brake system according to the present disclosure.

In the first mode, the rotation of the second gear 220 causes the rear end of the piston 100 to receive a force that gradually increases while moving along the first surface 221a of the guide part 221 to thereby slide in a "L1" direction as shown in FIG. 3. Then, when the second gear 220 is continuously rotated in the "T2" direction, the piston 100 passes through the first surface 221a of the guide part 221 to be positioned on the second surface 221b of the guide part 221. Accordingly, the pressure on the piston 100 is released, to thereby slide in a "L2" direction of FIG. 3. On the other hand, as shown in the drawing, since the guide part 221 is provided in plural, the forces to press and release the piston 100 according to the rotation of the second gear 220 may be repeatedly applied. Accordingly, the piston 100 may repeatedly press and release the inner pad plate 21. FIG. 6 is a diagram illustrating a brake braking force according to rotation of a second gear. As shown in FIG. 6, the horizontal axis represents the rotation angle (degree) of the second gear 220, and the vertical axis represents the brake braking force F acting on the disk. On the other hand, a dotted line of reference numeral "C1" refers to a braking force of a level at which the wheels of the vehicle are stopped. The electro-mechanical brake system of the present disclosure may be implemented to, even when the first motor M1 continuously rotates only in one direction, repeatedly press and release of the disk D to prevent a lock-up phenomenon in which the wheels of the vehicle are completely stopped. Therefore, when the first mode is implemented, the wheels of the vehicle are prevented from being stopped completely, the vehicle is prevented from being slid or pushed aside, so that driving stability is improved.

Referring to FIG. 6, the brake braking force has a form of increasing and decreasing with equal rotation angles of 90° of the second gear 220. FIG. 6 is a state diagram illustrating a case in which four guide parts 221 are provided, and the operation period of the brake braking force may vary according to the number of the plurality of guide parts 221. That is, when three guide parts 221 are provided, the operation period of the brake braking force may have a rotation angle of 120°. That is, a section in which the brake braking force F increases is the section in which the first surface 221a of the guide part 221 is in contact with the piston 100, and a section in which the brake braking force decreases is the second section in which the second surface 221b of the guide part 221 is passing through the piston 100.

Meanwhile, an unexplained reference numeral "C2" in FIG. 6 denotes an initial value of the brake braking force F. The position of "C2" may be controlled by adjusting the position of the second gear 220 through the second motor M2. That is, the position of "C2" may be moved upward or downward on the graph according to the position of the second gear 220. Meanwhile, the solid line graph of the brake braking force F may be moved upward or downward according to the position of "C2".

A second mode is to implement stopping (or parking) of the vehicle. In the second mode, the control part may control the second motor M2 to rotate in one direction. When the second motor M2 is rotated in one direction, the spindle S connected to the second motor M2 may be rotated in a "T3" direction of FIG. 3. The spindle S may transmit power of the second motor M2 to the nut part 223 of the second gear 220. The second gear 220 and the nut part 223 of the second gear 220 are slid in the forward direction ("L3" direction in FIG. 3) by the spindle S, and the piston 100 is pressed to slide in the "L1" direction in FIG. 3. Meanwhile, in order to release the stopped (or parked) vehicle, the control part may control the second motor M2 to rotate in the opposite direction. In this case, the spindle S connected to the second motor M2 may be rotated in a "T4" direction of FIG. 3. Accordingly, the second gear 220 is slid in a "L4" direction, and the piston 100 is released to slide in the "L2" direction to release the stopping (or parking) of the vehicle.

Figure 7:
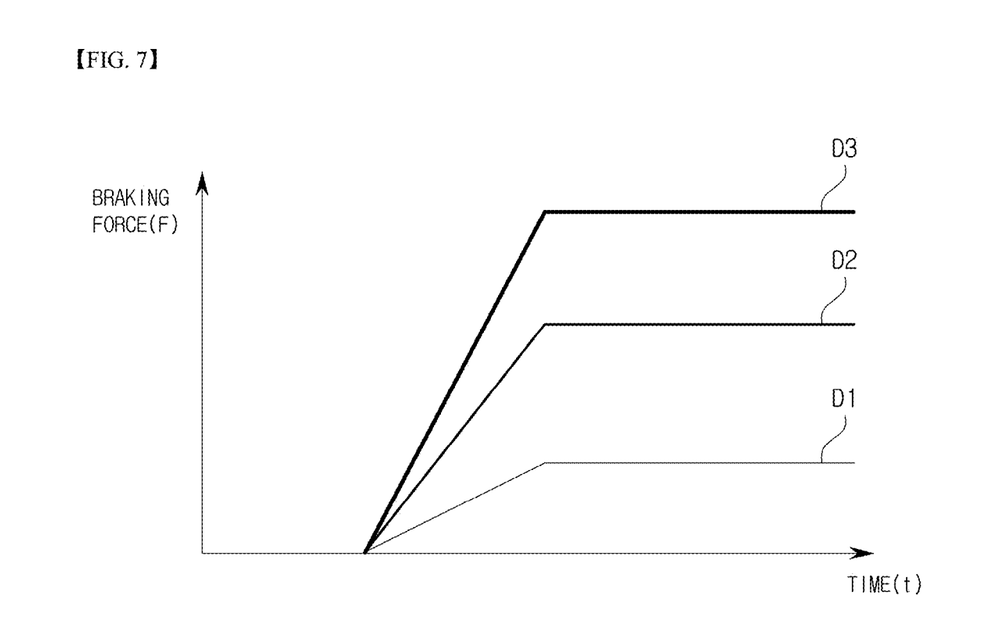

A third mode is to implement emergency braking. In the third mode, the control part may control the first motor M1 to be driven and control the second motor M2 to rotate in one direction. When the third mode is implemented, power of both the first motor M1 and the second motor M2 is transmitted to the second gear 220 so that the force to press the piston 100 may be maximally output. FIG. 7 is a graph illustrating brake braking force according to time when the brake operates. In FIG. 7, the horizontal axis represents time t, and the vertical axis represents brake braking force F. Meanwhile, "D1" in FIG. 7 indicates a braking force F when braking is performed using only the second motor M2, and "D2" indicates a braking force when braking is performed using only the first motor M1. "D3" in FIG. 7 indicates a brake braking force F during emergency braking using the first motor M1 and the second motor M2. In the case of the third mode for implementing the emergency braking as described above, the first motor M1 and the second motor M2 may be simultaneously used to implement the brake braking force, so that the force for pressing the piston 100 is momentarily maximally output. Accordingly, the braking distance of the vehicle may be shortened when the vehicle is braked.

On the other hand, when the first motor M1 fails, the control part may transmit a warning message to the driver through a cluster, etc., and when brake braking is required while driving, the control part may allow the second motor M2 to rotate in one direction to apply a pressure to the piston so that brake braking is implemented.

As is apparent from the above, the electro-mechanical brake system and the method of operating the same can effectively implement braking in various operating situations.

The electro-mechanical brake system and the method of operating the same can achieve rapid braking.

The electro-mechanical brake system and the method of operating the same can be provided with an improved performance and operational reliability.

The electro-mechanical brake system and the method of operating the same can be provided with an improved durability of a product by reducing a load applied to a component element.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

What is claimed is:

1. An electro-mechanical brake system comprising:
   a pair of pad plates disposed on both sides of a disk rotating together with a wheel;
   a piston configured to allow the pad plates to come in close contact with or to be separated from the disk;
   a first motor and a second motor configured to operate independently from each other and provide the piston with power;
   a first gear configured to decelerate power of the first motor and transmit the decelerated power;
   a second gear configured to convert power of the second motor into a translational motion and apply pressure to or release pressure on the piston while in contact with the piston, the second gear including a guide part slantly formed on a portion of the second gear that comes in contact with the piston; and
   a connecting part connecting the first gear and the second gear to each other to allow the first gear and the second gear to rotate together with each other, the connecting part configured to couple the first gear and the second gear such that the second gear is slidable with respect to the first gear.

2. The electro-mechanical brake system of claim 1, wherein the connecting part includes a plurality of connection holes passing through an upper side and a lower side of the first gear and a plurality of connection pins provided to be slidably coupled to the plurality of connection holes.

3. The electro-mechanical brake system of claim 1, wherein the guide part includes a first surface protruding forward with a slope such that a force to press the piston is gradually increased during a rotation of the second gear and a second surface obliquely depressed rearward such that the force, passing through the first surface, to press the piston is released.

4. The electro-mechanical brake system of claim 1, further comprising a belt part configured to transmit power output through a drive shaft of the first motor to the first gear.

5. The electro-mechanical brake system of claim 1, wherein the second gear is provided with a nut part that allows the second gear to move forward and backward according to a rotation of a spindle for outputting power of the second motor.

6. The electro-mechanical brake system of claim 3, wherein a plurality of the guide parts are consecutively provided along a circumferential direction on a front surface of the second gear.

7. The electro-mechanical brake system of claim 6, wherein the guide part is provided to come in contact with a rear portion of the piston.

8. The electro-mechanical brake system of claim 7, wherein the piston includes a rotating ball supported at the rear end thereof to enable free rotation.

9. The electro-mechanical brake system of claim 5, wherein the nut part is formed in a hollow cylinder shape and connected to the second motor by passing through the first gear.

10. The electro-mechanical brake system of claim 1, further comprising a control part configured to detect whether the first motor and the second motor operate, and control the operation of the first motor and the second motor.

11. A method of operating the electro-mechanical brake system of claim 10, wherein the guide part is provided as a plurality of guide parts consecutively provided along a circumferential direction of the second gear, and by the first gear and the second gear rotating together with each other according to operation of the first motor, repeatedly applies pressure to and releases pressure on the piston.

12. The method of claim 11, wherein the second gear is configured to, when the second motor rotates in one direction, slidably advance to press the piston, and when the second motor rotates in an opposite direction, slidably retreat to release the pressure of the piston.

13. The method of claim 12, wherein in a first mode to implement an anti-lock brake system (ABS), the control part is configured to control to drive the first motor while the second motor is prevented from being driven.

14. The method of claim 12, wherein in a second mode to stop a vehicle, the controller is configured to control to rotate the second motor in the one direction.

15. The method of claim 12, wherein in a third mode to implement an emergency braking, the control part is configured to control the first motor to drive in a direction that the piston is pressed by the guide part and control the second motor to rotate in the one direction.

* * * * *